(12) United States Patent
Takigami et al.

(10) Patent No.: US 10,845,674 B2
(45) Date of Patent: *Nov. 24, 2020

(54) GHOST REDUCING DEVICE, IMAGING DEVICE INCLUDING SAME, GHOST REDUCING METHOD, AND IMAGING OPTICAL SYSTEM

(71) Applicant: KAMUY Innovation Corporation, Sapporo (JP)

(72) Inventors: Koutarou Takigami, Sapporo (JP); Yasuhiro Sawada, Sapporo (JP)

(73) Assignee: KAMUY Innovation Corporation, Sapporo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,917

(22) PCT Filed: Nov. 24, 2016

(86) PCT No.: PCT/JP2016/084771
§ 371 (c)(1),
(2) Date: May 24, 2018

(87) PCT Pub. No.: WO2017/090670
PCT Pub. Date: Jun. 1, 2017

(65) Prior Publication Data
US 2018/0356708 A1   Dec. 13, 2018

(30) Foreign Application Priority Data

Nov. 24, 2015   (JP) ................................ 2015-228966

(51) Int. Cl.
*G03B 11/00*   (2006.01)
*G03B 9/02*   (2006.01)
(Continued)

(52) U.S. Cl.
CPC .............. *G03B 11/00* (2013.01); *G02B 5/003* (2013.01); *G02B 5/005* (2013.01); *G02B 26/023* (2013.01);
(Continued)

(58) Field of Classification Search
None
See application file for complete search history.

(56) References Cited

U.S. PATENT DOCUMENTS 4,526,458 A * 7/1985 Kawamura .............. G02B 7/34
                                                        396/114
4,561,731 A * 12/1985 Kley ................. G02F 1/134309
                                                        349/1
(Continued)

FOREIGN PATENT DOCUMENTS

JP    S59-58420 U    4/1984
JP    H08-334725 A    12/1996
(Continued)

*Primary Examiner* — Derek S. Chapel
(74) *Attorney, Agent, or Firm* — Muncy, Geissler, Olds & Lowe, P.C.

(57) ABSTRACT

A ghost reducing device and an imaging device provided with it, a ghost reducing method, and an imaging optical system that can effectively reduce ghosts while having a simple and inexpensive configuration. A ghost reducing device includes a douser that has at least one opening that lets light pass through, and that totally blocks light in a symmetrical position of the opening with respect to an optical axis of an imaging optical system. The douser is disposed in the vicinity of a pupil position of the imaging optical system.

7 Claims, 5 Drawing Sheets

(51) Int. Cl.
  *G02B 5/00* (2006.01)
  *G02B 26/02* (2006.01)
  *G02B 27/00* (2006.01)
  *H04N 5/225* (2006.01)
  *G03B 11/04* (2006.01)
  *G03B 5/00* (2006.01)

(52) U.S. Cl.
  CPC ........... *G02B 27/0018* (2013.01); *G03B 5/00* (2013.01); *G03B 9/02* (2013.01); *G03B 11/045* (2013.01); *H04N 5/225* (2013.01); *G03B 2205/0069* (2013.01)

(56) References Cited

U.S. PATENT DOCUMENTS

| | | | | |
|---|---|---|---|---|
| 5,831,736 | A * | 11/1998 | Lichtman | G01B 11/24 356/613 |
| 7,780,364 | B2 * | 8/2010 | Raskar | H04N 5/2254 396/505 |
| 2011/0058242 | A1 * | 3/2011 | Saito | G02B 5/005 359/227 |
| 2014/0049833 | A1 * | 2/2014 | Totani | G02B 27/0172 359/633 |
| 2014/0320686 | A1 * | 10/2014 | Hjelmstrom | H04N 5/2351 348/218.1 |
| 2014/0340635 | A1 * | 11/2014 | Oyaizu | A61B 3/107 351/206 |
| 2015/0268394 | A1 * | 9/2015 | Uchiyama | G02B 1/115 359/653 |
| 2016/0306155 | A1 * | 10/2016 | Suzuki | G02B 21/26 |
| 2019/0058820 | A1 * | 2/2019 | Sawada | G03B 11/00 |

FOREIGN PATENT DOCUMENTS

| | | |
|---|---|---|
| JP | H10-62669 A | 3/1998 |
| JP | 2005-156936 A | 6/2005 |
| JP | 2006-065086 A | 3/2006 |
| JP | 2007-212745 A | 8/2007 |
| JP | 2014-217059 A | 11/2014 |

* cited by examiner

GHOST REDUCING DEVICE, IMAGING DEVICE INCLUDING SAME, GHOST REDUCING METHOD, AND IMAGING OPTICAL SYSTEM

TECHNICAL FIELD

This invention relates to a ghost reducing device and an imaging device provided with it, a ghost reducing method, and an imaging optical system that can reduce ghosts caused by high-luminance subjects such as the sun.

BACKGROUND ART

It has conventionally been known that when light from a high-luminance subject such as the sun enters an imaging optical system, it is reflected by the surface of a lens, the inner surface of a barrel, etc., and becomes stray light. Because such stray light becomes a cause of forming unintended images (ghosts) within an imaging screen, technologies for preventing stray light have been proposed to reduce the ghosts.

For example, disclosed in Japanese Unexamined Patent Application No. H10-62669 is a technology to reduce ghosts by changing the operating size of an aperture according to the effective luminous flux that changes based on an aperture value (Patent Document 1). Also, proposed in Japanese Unexamined Patent Application No. H08-334725 is a technology to reduce harmful light by restricting a diaphragm within an aperture value that is smaller than its open value. Furthermore, proposed is a method to suppress ghosts by reducing reflectance by coating a lens surface (Patent Document 2).

PRIOR ART DOCUMENTS

Patent Documents

[Patent Doc. 1] JP Laid-Open Patent Publication H10-62669
[Patent Doc. 2] JP Laid-Open Patent Publication H8-334725

SUMMARY OF THE INVENTION

Subject(s) to be Solved by Invention

However, in such conventional ghost reduction technologies as mentioned above, there is a drawback that there is a case where stray light still cannot be totally removed, generating ghosts. Also, in the inventions according to Patent Documents 1 and 2, there is also a drawback that the device becomes more complex and costly because the aperture size and diaphragm need to be controlled.

This invention has been made in order to solve such drawbacks as these, and its objective is to offer a ghost reducing device and an imaging device provided with it, a ghost reducing method, and an imaging optical system that can effectively reduce ghosts while having a simple and inexpensive configuration.

Means to Solve the Subject(s)

A ghost reducing device of the invention comprises a douser that has at least one opening that lets light pass through, and that totally blocks light in a symmetrical position of the opening with respect to an optical axis of an imaging optical system, wherein the douser is disposed in the vicinity of a pupil position of the imaging optical system.

As another embodiment of the invention, the opening may be formed in only one position on one side of a line perpendicular to the optical axis.

As another embodiment of the invention, the opening may be formed in one circular shape, which centers on a position offset from the optical axis.

As another embodiment of the invention, it may includes an advance/retreat drive means that causes the douser to advance or retreat relative to the imaging optical system, a light detection means that detects an intensity of light, and a control means that monitors the intensity of light detected by the light detection means and controls the advance/retreat drive means so as to dispose the douser advanced toward the imaging optical system if the intensity of light is no lower than a prescribed threshold value or to retreat the douser from the imaging optical system if the intensity of light is lower than the prescribed threshold value.

An imaging device of the invention is provided with the ghost reducing device discussed above.

In a ghost reducing method of the invention, a douser having at least one opening that lets light pass through and totally blocks light in a symmetrical position of the opening with respect to an optical axis of an imaging optical system is disposed in the vicinity of a pupil position of the imaging optical system, and reflected light from an imaging element is blocked by the douser.

An imaging optical system of the invention that forms an image of light from a subject through a lens onto an imaging element includes a douser that has at least one opening that lets light pass through, and that totally blocks light in a symmetrical position of the opening with respect to an optical axis of the imaging optical system, wherein the douser is disposed in the vicinity of a pupil position of the imaging optical system.

Advantage of the Invention

This invention can effectively reduce ghosts in spite of having a simple and inexpensive configuration.

BRIEF EXPLANATIONS OF THE DRAWINGS

FIG. 1 is a diagram showing an embodiment of the ghost reducing device, the imaging device, and the imaging optical system of this invention.
FIG. 2 is a drawing showing a diaphragm in the first embodiment.
FIG. 3 is a diagram showing a douser in the first embodiment.
FIG. 4 is a diagram showing the dispositions of the douser and the diaphragm in the first embodiment.
FIG. 5 is a diagram showing an example douser having three arc-shaped openings.
FIG. 6 is a diagram showing an example douser having one opening in a yin-yang symbol shape.
FIG. 7 is a diagram showing an example douser having one opening in a circular shape centering on a position off the optical axis.
FIG. 8 is a diagram showing an example douser having one opening in an elliptical shape centering on a position off the optical axis.
FIG. 9 is a block diagram showing the second embodiment of the ghost reducing device, the imaging device, and the imaging optical system of this invention.

FIG. 10 is a diagram showing an automobile in this Example 1, having the ghost reducing device, the imaging device, and the imaging optical system of this invention built-in.

DETAILED DESCRIPTIONS OF PREFERRED EMBODIMENT(S)

Figure 11:
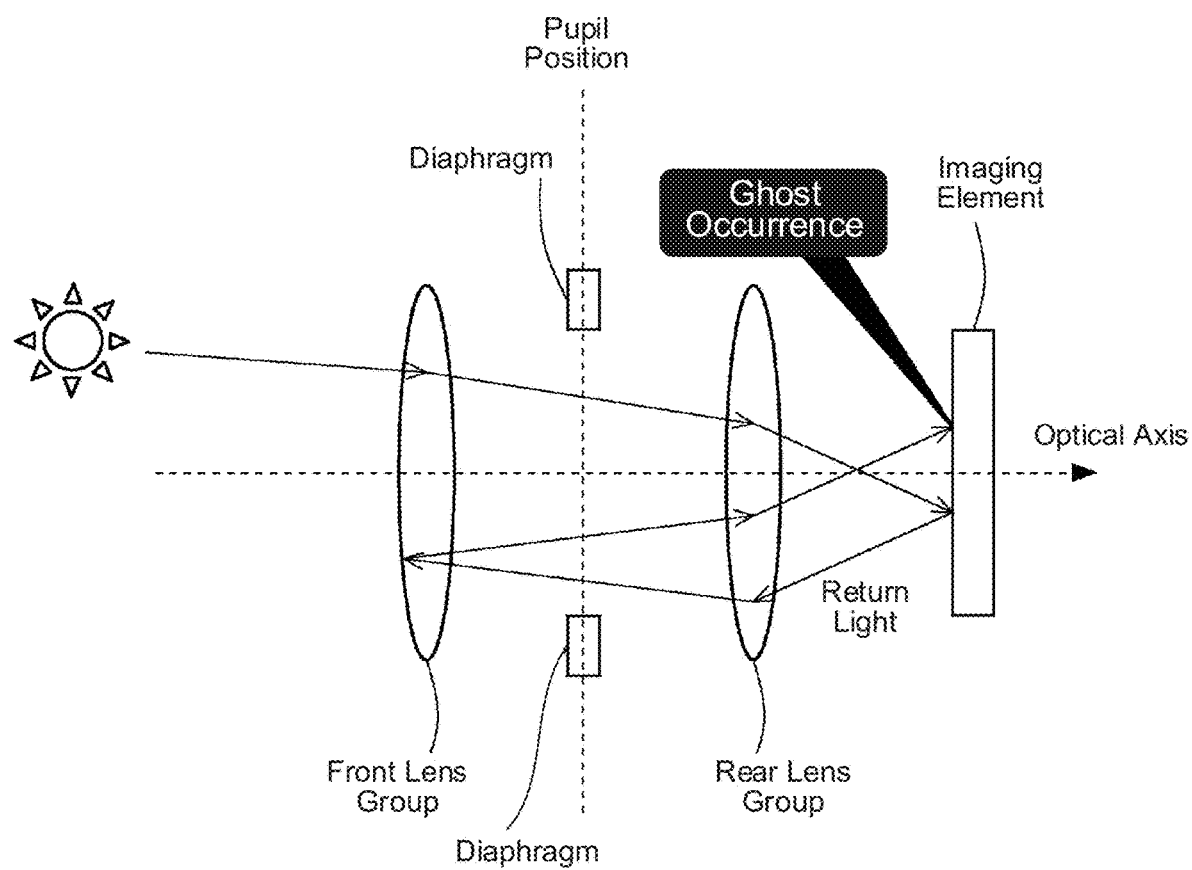
FIG. 11 is a diagram showing a cause of ghost occurrences in a conventional imaging optical system.

First, as a result of their diligent research and trials and errors, inventors of this application discovered that reflection on the imaging surface of a photographic film or an image sensor was greater than reflection on a lens surface for light from a high-luminance subject such as the sun. Then, they discovered that unnecessary light reflected on the imaging surface is reflected by the lens and becomes return light, becoming a major cause to generate a ghost as shown in FIG. 11.

Then, the inventors of this application conceived an idea of effectively reducing the ghost by suppressing the unnecessary light reflected on the imaging surface so that it will not return to the imaging surface, and came to complete this invention. Explained below referring to drawings is the first embodiment of the ghost reducing device and the imaging device provided with it, the ghost reducing method, and the imaging optical system of this invention.

Figure 1:
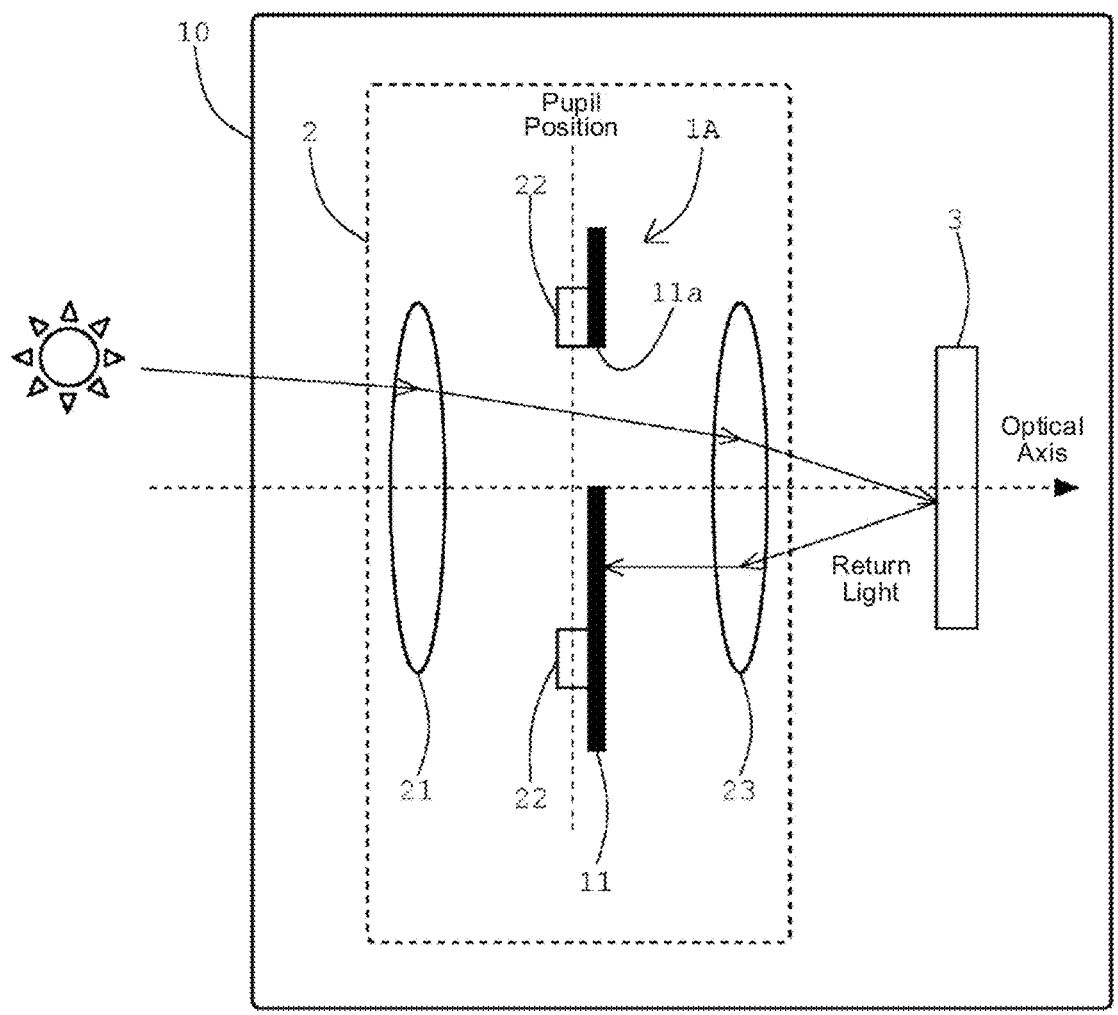

FIG. 1 is a diagram showing an imaging device 10 provided with an imaging optical system 2 containing a ghost reducing device 1A of this first embodiment. As shown in FIG. 1, the imaging device 10 of this first embodiment is mainly configured of the imaging optical system 2 for imaging a subject, and an imaging element 3 disposed in the focal position of this imaging optical system 2. Then, by disposing the ghost reducing device 1A in the vicinity of the pupil position of the imaging optical system 2, return light reflected by the surface of the imaging element 3 is blocked, reducing ghosts. Below, their configurations are explained.

The imaging optical system 2 forms an image of light from a subject onto the imaging element 3 through a lens. In this first embodiment, as shown in FIG. 1, the imaging optical system 2 has a front lens group 21 disposed in the front of the pupil position, a diaphragm 22 disposed in the pupil position, the ghost reducing device 1A disposed in the immediate rear of the pupil position, and a rear lens group 23 disposed in the rear of the pupil position.

The front lens group 21 and the rear lens group 23 are each configured of at least one lens and form an image of light from a subject onto the imaging element 3. Note that although the imaging optical system 2 has the front lens group 21 and the rear lens group 23 in this first embodiment, this invention is not limited to this configuration but can effectively apply to the imaging optical system 2 having at least the front lens group 21.

Figure 2:
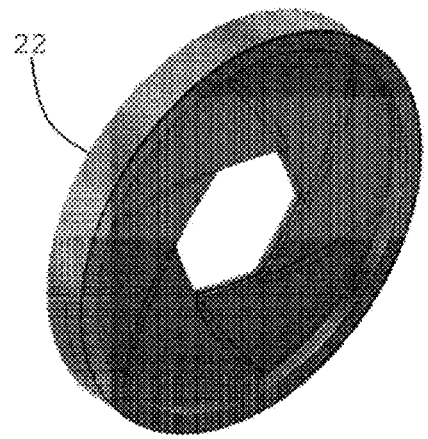

The diaphragm 22 is disposed in the pupil position of the imaging optical system 2 for adjusting the amount of passing light. In this first embodiment, as shown in FIG. 2, the diaphragm 22 is configured of an iris diaphragm that can increase or decrease the size of an aperture without changing the center position of the aperture. Note that although the imaging optical system 2 having the diaphragm 22 is used in this first embodiment, this invention is not limited to this configuration but is also applicable to the imaging optical system 2 having no diaphragm 22.

Figure 3:
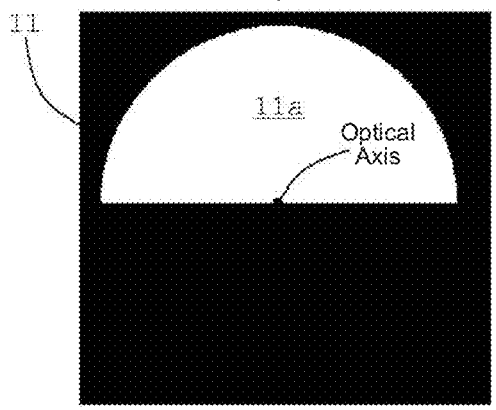
Figure 4:
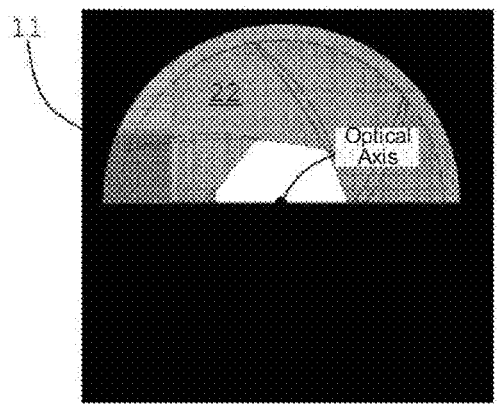

The ghost reducing device 1A is for blocking return light from the imaging element 3 and reducing ghosts. In this first embodiment, the ghost reducing device 1A is configured of a douser 11 made of a black material having low reflectance. Also, as shown in FIG. 3, the douser 11 has an opening 11a that is formed in a semicircular shape with approximately the same diameter as the aperture of the diaphragm 22 and lets light pass through. Then, as shown in FIG. 4, it is installed in the immediate rear of the diaphragm 22 so that the center of the opening 11a coincides with the optical axis. Thereby, the douser 11 has the opening 11a disposed on only one side of a line perpendicular to the optical axis to let light pass through and block light on the other side.

Note that although in this first embodiment, the ghost reducing device 1A is disposed in the immediate rear of the diaphragm 22 because the diaphragm 22 is installed in the pupil position, this invention is not limited to this configuration. In the case of the imaging optical system 2 and the imaging device 10 without the diaphragm 22, the ghost reducing device 1A can be disposed in the pupil position of the imaging optical system 2. Also, the vicinity of the pupil position in this invention is a concept that is not limited to the pupil position but includes any position, such as the immediate rear of the pupil position, that is close to the pupil position within a range where the ghost reduction effect of this invention can be performed without generating vignetting.

The imaging element 3 is configured of a CCD (Charge-Coupled Device) image sensor or the like, photoelectrically converts brightness degrees of portions of an image formed on a light-receiving surface into the amounts of charge, and sequentially reads and converts them into electric signals. Note that although the imaging optical system 2 has the imaging element 3 in this first embodiment, this invention is not limited to this configuration but is also applicable to an imaging optical system having no imaging element 3, such as a film camera.

Next, explained are actions by the ghost reducing device 1A provided with the above-mentioned configuration and the imaging device 10 provided with it, the ghost reducing method, and the imaging optical system 2 in this first embodiment.

First, in this first embodiment, as shown in FIG. 1, the douser 11 as the ghost reducing device 1A is disposed in the vicinity of the pupil position of the imaging optical system 2. Because this douser 11 is simply a black plate, it has an extremely simple configuration and is inexpensive.

Next, in the imaging optical system 2 of this first embodiment, if a high-luminance subject such as the sun exists in its field of view, as shown in FIG. 1, the ghost reducing device 1A in the vicinity of the pupil position restricts an incident luminous flux to light passing through the opening 11a formed on the upper half of a line perpendicular to the optical axis. At this time, in this first embodiment, only one opening 11a is formed on one side of a line perpendicular to the optical axis. Also, because the area of the opening 11a is the maximum under the condition that the symmetrical position of the opening 11a with respect to the optical axis is totally blocked, a sufficient amount of light can be secured.

Light that passed through the ghost reducing device 1A forms an image on the surface of the imaging element 3 through the rear lens group 23, and most of it is absorbed into the imaging element 3. However, as shown in FIG. 1, part of the light is specularly reflected on the surface of the imaging element 3 and becomes return light. When it comes back to the vicinity of the pupil position again, as shown in FIG. 1, this return light reaches the symmetrical position to the position where it entered with respect to the optical axis.

That is, in this first embodiment, because the return light is derived from light that passed through the opening 11a installed on the upper half of the douser 11, all of it comes back to the lower half of the douser 11 in the vicinity of the pupil position. Thereby, the douser 11 totally blocks the return light in the vicinity of the pupil position and never returns it forward. Therefore, the ghost reducing device 1A of this first embodiment effectively suppresses such a phenomenon as shown in FIG. 11 that return light reaches the front lens group 21 and is reflected again by the front group lens 21, generating a ghost image on the surface of the imaging element 3.

Note that if the rear lens group 23 has many lenses, the probability that return light is reflected before reaching the douser 11 and returns to the imaging element 3 becomes high, therefore the number of removed ghosts is relatively small. However, if the front lens group 21 has many lenses, many ghosts (return light) that are targets of removal are generated, therefore the effect of the douser 11 that can block them is extremely great.

According to this first embodiment mentioned above, the following effects are achieved.

1. Ghosts can be effectively reduced in spite of its simple and inexpensive configuration.

2. Because ghosts are effectively reduced, easy-to-see images can be offered in surveillance cameras, automobile-mounted cameras, etc. that are demanded to photograph a certain region constantly.

3. Especially when the front lens group 21 has many lenses, a great ghost reduction effect is performed.

4. If an image recognition technology is applied to an image taken by the imaging device 10 as in a machine vision system, ghosts that become noise can be reduced, therefore the recognition accuracy can be improved.

Note that although in this first embodiment mentioned above, the douser 11 has one semicircular opening 11a on only one side relative to a line perpendicular to the optical axis, this invention is not limited to this configuration. That is, the douser 11 only needs to have at least one opening 11a that lets light pass through and block light totally in the symmetrical position to the opening 11a with respect to the optical axis of the imaging optical system 2.

Figure 5:
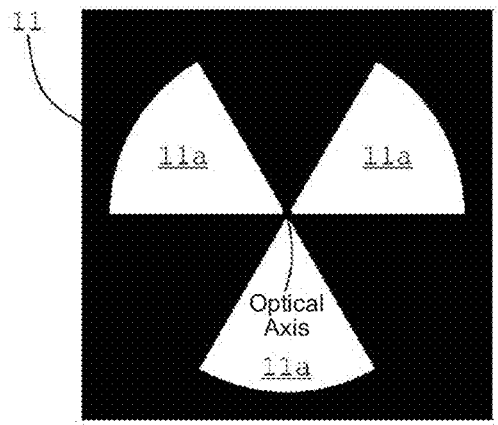

For example, as shown in FIG. 5, three openings 11a, each of which is formed in an arc shape with a central angle of 60 degrees, can be installed with 60-degree intervals around the optical axis. In this manner, even with the douser 11 having multiple openings 11a on not only one side but also both sides of a line perpendicular to the optical axis, light is totally blocked in the symmetrical positions of the openings 11a with respect to the optical axis of the imaging optical system 2.

Figure 6:
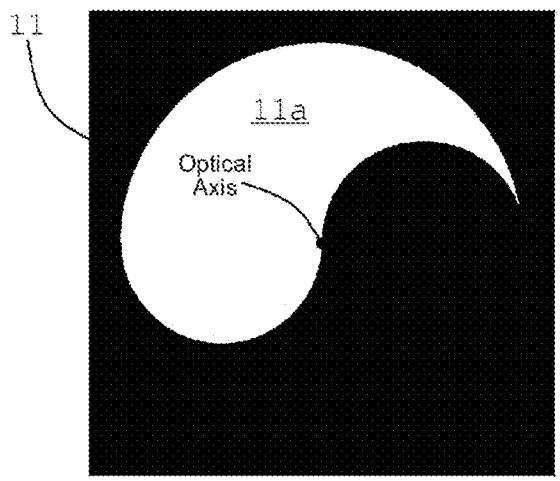

Also, as shown in FIG. 6, an opening 11a that resembles one half of the yin-yang symbol can be formed on the douser 11. In this manner, even if the douser 11 has one opening 11a across both sides of a line perpendicular to the optical axis, light is totally blocked in the symmetrical position to the opening 11a with respect to the optical axis of the imaging optical system 2.

Figure 7:
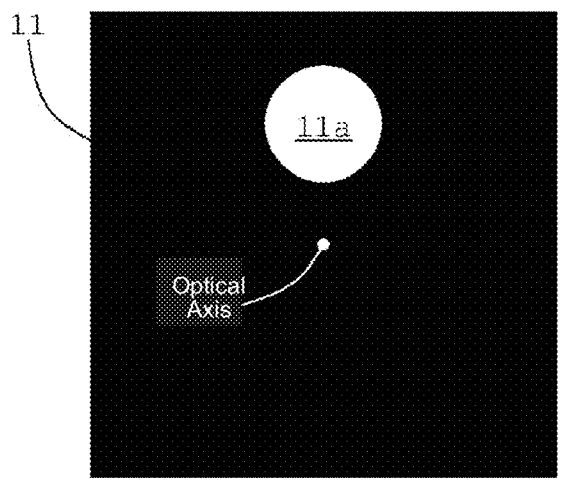

Furthermore, as shown in FIG. 7, the douser 11 can have one opening 11a formed in a circular shape centering on a position off the optical axis. By this kind of douser 11, a natural blurred image in a circular shape can be obtained.

Figure 8:
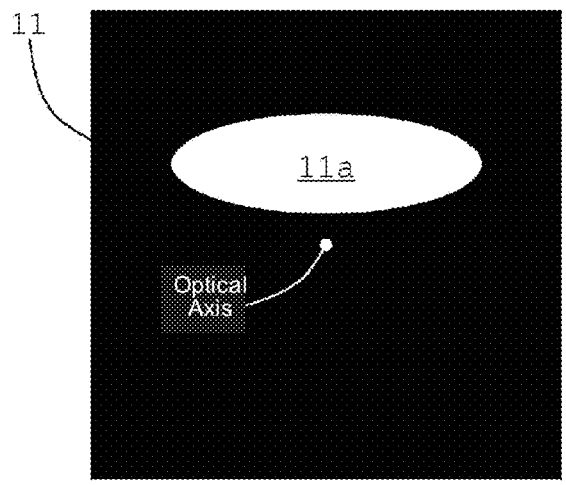

Also, as shown in FIG. 8, the douser 11 can have one opening 11a formed in an elliptical shape centering on a position off the optical axis. By this kind of douser 11, a sufficient amount of light can be secured compared with the opening 11a in FIG. 7.

Next, explained is the second embodiment of the ghost reducing device and the imaging device provided with it, the ghost reducing method, and the imaging optical system of this invention. Note that components in the second embodiment that are identical or correspond to those in the first embodiment mentioned above are given the same reference numerals, and their repeated explanations are omitted.

Figure 9:
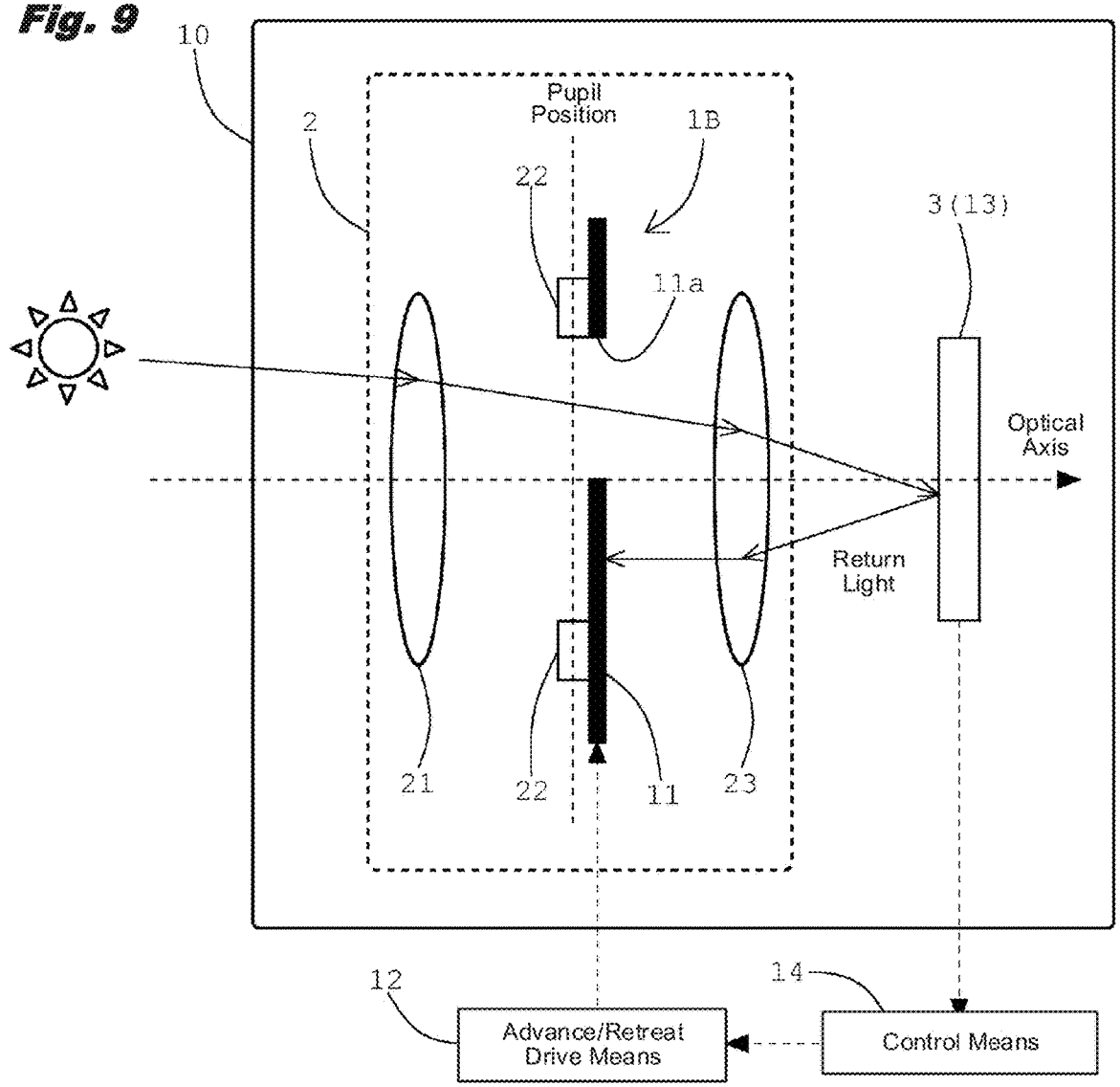

A characteristic of this second embodiment is that a ghost reducing device 1B is let function only when a high-luminance subject such as the sun enters its photographing field. Specifically, as shown in FIG. 9, the ghost reducing device 1B of this second embodiment has an advance/retreat drive means 12 that lets the douser 11 advance or retreat relative to the imaging optical system 2, a light detection means 13 that detects the intensity of light, and a control means 14 that controls the advance/retreat drive means 12 based on the detection result of this light detection means 13.

The advance/retreat drive means 12 lets the douser 11 advance or retreat relative to the imaging optical system 2. In this embodiment, the advance/retreat drive means 12 is configured of a solenoid actuator that lets the douser 11 move sliding along a direction perpendicular to the optical axis. However, not being limited to this configuration, it can be any mechanism that can let the douser 11 advance or retreat relative to the imaging optical system 2.

The light detection means 13 detects the intensity of light entering the imaging optical system 2. In this embodiment, the imaging element 10 is also used as the light detection means 13. However, not being limited to this configuration, any light sensor such as one having built-in cadmium sulfide (CdS) cells can be adopted as the light detection means 13 as long as it can detect the intensity of light entering the imaging optical system 2.

The control means 14 is configured of a CPU (Central Processing Unit) etc. and controls the advance/retreat drive means 12 based on the detection result of the light detection means 13. In this second embodiment, if the intensity of light is no lower than a prescribed threshold value, the control means 14 disposes the douser 11 advanced toward the imaging optical system 2. On the other hand, if the intensity of light is lower than the prescribed threshold value, the control means 14 controls the advance/retreat means 12 so as to let the douser 11 retreat from the imaging optical system 2.

In the above configuration, the intensity of light that makes ghosts easy to occur is obtained in advance, and that intensity of light is set as the above-mentioned threshold value. Thereby, once a subject having such a high luminance as to generate ghosts enters the photographing field, the douser 11 advances toward the imaging optical system 2 and reduces the ghosts. On the other hand, if there is no subject having such a high luminance as to generate ghosts within the photographing field, the douser 11 retreats and secures a sufficient amount of light.

By the ghost reducing device 1B and the imaging device 10 provided with it, the ghost reducing method, and the imaging optical system 2 of this second embodiment mentioned above, in addition to achieving the same actions and effects as the above-mentioned first embodiment, under the photographing condition where no ghost is generated, the douser 11 can automatically retreat to secure a sufficient amount of light.

Next, explained is a specific example of the ghost reducing device and the imaging device provided with it, the ghost reducing method, and the imaging optical system of this invention.

Example 1

In this Example 1, it was presumed that the ghost reducing device 1A, the imaging device 10, and the imaging optical system 2 of the above-mentioned first embodiment were mounted on an automobile.

Figure 10:
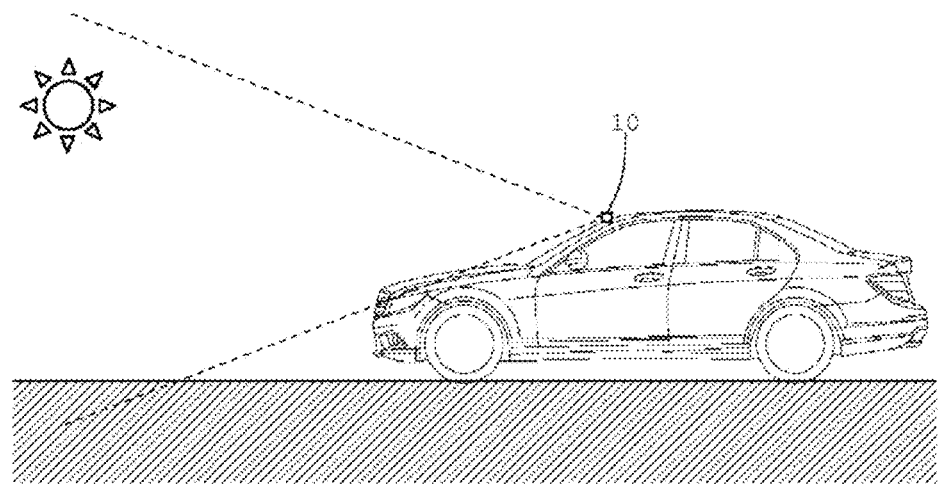

Specifically, as shown in FIG. 10, a vehicle-mounted camera as the imaging device 10 was installed facing the front in the vicinity of the upper end of the windshield. In this case, light from the sun that is a high-luminance subject would enter depending on time of the day and the orientation of the automobile.

In the above configuration, the ghost reducing device 1A restricted the incident luminous flux of sunlight entering the imaging optical system 2 to only light that passes through the opening 11a of the douser 11. Also, the douser 11 blocked return light that was reflected by the surface of the imaging element 3 and returned to the vicinity of the pupil position. Therefore, even when the sun was within the photographing field, ghost occurrences were effectively suppressed in images of the vehicle-mounted camera.

According to this Example 1 above, it has been demonstrated that even in a vehicle-mounted camera that is demanded to photograph a certain region constantly, ghosts can be effectively reduced, and easy-to-see images can be offered.

Note that the ghost reducing device and the imaging device provided with it, the ghost reducing method, and the imaging optical system of this invention are not limited to the above-mentioned embodiments or example but can be changed as appropriate.

For example, in the above-mentioned embodiments, the imaging device 10 of this invention is applied to a digital video camera, and the imaging optical system 2 of this invention is applied to an imaging optical system built in the digital video camera. However, the scope of application of this invention is not limited to the above, but this invention can be widely applied to imaging optical systems built in various kinds of cameras such as digital still cameras, film cameras, and cameras built in smartphones and tablets, and imaging devices provided with these imaging optical systems.

DESCRIPTION OF REFERENCE NUMERALS

1A: Ghost reducing device (First embodiment)
1B: Ghost reducing device (Second embodiment)
2: Imaging optical system
3: Imaging element
10: Imaging device
11: Douser
11a: Opening
12: Advance/retreat drive means
13: Light detection means
14: Control means
21: Front lens group
22: Diaphragm
23: Rear lens group

What is claimed is:

1. A ghost reducing device, comprising:
    a douser that is rotationally fixed and has at least one opening that lets light pass through and an area that totally blocks light and being disposed in a symmetrical position of the opening with respect to an optical axis of an imaging optical system, wherein
    the douser is disposed in the vicinity of a pupil position of the imaging optical system, and
    the at least one opening is disposed at a fixed position on the douser and has a predetermined fixed shape that does not extend from one position on the douser to another position over the optical axis in a symmetrical manner.

2. The ghost reducing device according to claim 1, wherein
    the opening is formed in only one position on one side of a line perpendicular to the optical axis.

3. The ghost reducing device according to claim 1, wherein
    the opening is formed in one circular shape, which centers on a position offset from the optical axis.

4. The ghost reducing device according to claim 1, further comprising:
    an advance/retreat drive means that causes the douser to advance or retreat relative to the imaging optical system,
    a light detection means that detects an intensity of light, and
    a control means that monitors the intensity of light detected by the light detection means and controls the advance/retreat drive means so as to dispose the douser advanced toward the imaging optical system if the intensity of light is no lower than a prescribed threshold value or to retreat the douser from the imaging optical system if the intensity of light is lower than the prescribed threshold value.

5. An imaging device provided with the ghost reducing device according to claim 1.

6. A ghost reducing method, wherein a douser having at least one opening that lets light pass through and an area that totally blocks light and being disposed in a symmetrical position of the opening with respect to an optical axis of an imaging optical system is rotationally fixed in the vicinity of a pupil position of the imaging optical system, reflected light from an imaging element is blocked by the douser, and the at least one opening is disposed at a fixed position on the douser and has a predetermined fixed shape that does not extend from one position on the douser to another position over the optical axis in a symmetrical manner.

7. An imaging optical system that forms an image of light from a subject through a lens onto an imaging element, comprising:
    a douser that is rotationally fixed and has at least one opening that lets light pass through and an area that totally blocks light and that is disposed in a symmetrical position of the opening with respect to an optical axis of the imaging optical system, wherein
    the douser is disposed in the vicinity of a pupil position of the imaging optical system, and
    the at least one opening is disposed at a fixed position on the douser and has a predetermined fixed shape that does not extend from one position on the douser to another position over the optical axis in a symmetrical manner.

* * * * *